US011673310B2

(12) United States Patent
Gleu et al.

(10) Patent No.: US 11,673,310 B2
(45) Date of Patent: Jun. 13, 2023

(54) INJECTION-MOLDING DEVICE, PROJECTILE INJECTION PROCESS AND RELATED DEVICES

(71) Applicant: Continental Teves AG & Co. OHG, Frankfurt (DE)

(72) Inventors: Jens-Uwe Gleu, Langenhagen (DE); Alexander Hofmann, Hannover (DE)

(73) Assignee: Continental Teves AG & Co. OHG, Frankfurt am Main (DE)

( * ) Notice: Subject to any disclaimer, the term of this patent is extended or adjusted under 35 U.S.C. 154(b) by 15 days.

(21) Appl. No.: 16/712,420

(22) Filed: Dec. 12, 2019

(65) Prior Publication Data
US 2020/0189168 A1 Jun. 18, 2020

(30) Foreign Application Priority Data
Dec. 18, 2018 (DE) .................... 10 2018 222 214.2
Jun. 28, 2019 (DE) .................... 10 2019 209 489.9

(51) Int. Cl.
*B29C 49/06* (2006.01)
*B29C 49/10* (2006.01)
*B29C 49/46* (2006.01)

(52) U.S. Cl.
CPC .............. *B29C 49/06* (2013.01); *B29C 49/10* (2013.01); *B29C 49/46* (2013.01)

(58) Field of Classification Search
CPC ......... B29C 49/06; B29C 49/10; B29C 49/46; B29C 45/16; B29C 45/17; B29C 45/1704;
(Continued)

(56) References Cited

U.S. PATENT DOCUMENTS

2011/0254184 A1   10/2011   Eckardt
2014/0377498 A1   12/2014   Flock et al.
(Continued)

FOREIGN PATENT DOCUMENTS

CN   104512002 A   4/2015
CN   104512009 A   4/2015
(Continued)

OTHER PUBLICATIONS

German Office Action dated Feb. 23, 2021 for the counterpart German Patent Application No. 10 2019 209 489.9.
(Continued)

*Primary Examiner* — Galen H Hauth
*Assistant Examiner* — Shibin Liang

(57) ABSTRACT

An injection-molding device for producing a hollow-formed plastic object, at least comprising a mold for the primary shaping of the plastic object, an injection device for at least partially introducing a flowable polymer melt into a cavity within the mold and a fluid injection device for introducing a pressurized fluid and for driving a projectile through the polymer melt introduced into the cavity, the mold comprising a mold wall and a mold core that is arranged at least partially within the mold wall, the projectile being formed at least partially in such a hollow-formed manner that it is arranged on the mold core and is movable along a longitudinal extent of the mold core on the latter. A projectile injection process for producing a hollow-formed plastic object with this injection-molding device and a hollow-formed plastic object produced by this process.

17 Claims, 7 Drawing Sheets

(58) Field of Classification Search
CPC ............ B29C 45/1705; B29C 45/1639; B29C 2045/0087
See application file for complete search history.

(56) References Cited

U.S. PATENT DOCUMENTS

| | | |
|---|---|---|
| 2019/0009443 A1 | 1/2019 | Wolf |
| 2019/0070761 A1* | 3/2019 | Duenkelmann ..... B29C 45/1704 |
| 2020/0290250 A1 | 9/2020 | Wolf |

FOREIGN PATENT DOCUMENTS

| | | |
|---|---|---|
| CN | 108367473 A | 8/2018 |
| CN | 108698281 A | 10/2018 |
| DE | 102008023473 A1 | 11/2009 |
| DE | 102008046602 A1 | 3/2010 |
| DE | 102012204036 A1 | 7/2013 |
| DE | 102016103280 B3 | 5/2017 |
| DE | 102015225247 A1 | 6/2017 |
| EP | 2377666 A1 | 10/2011 |
| WO | 2009138431 A1 | 11/2009 |

OTHER PUBLICATIONS

Chinese First Office Action dated Jun. 25, 2021, for the counterpart Chinese Application No. 201900299262.1.

* cited by examiner

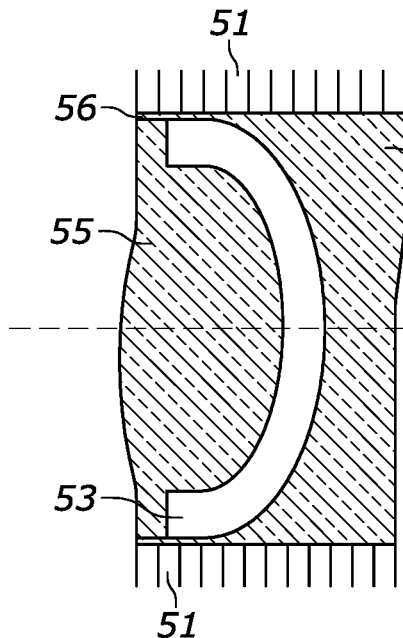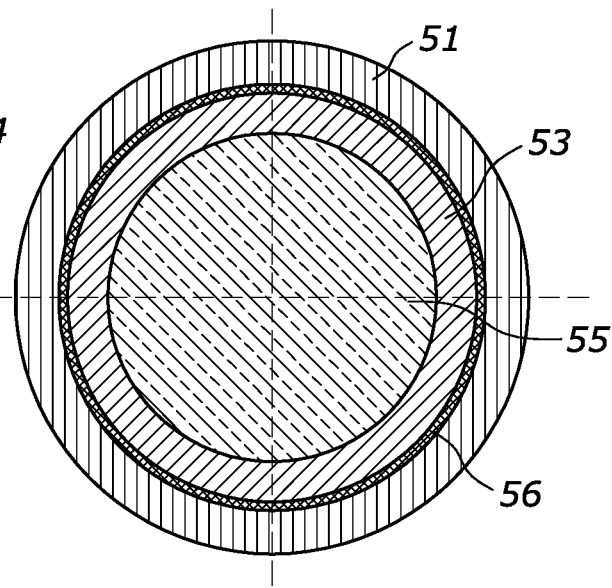
PRIOR ART
FIG. 1A    FIG. 1B
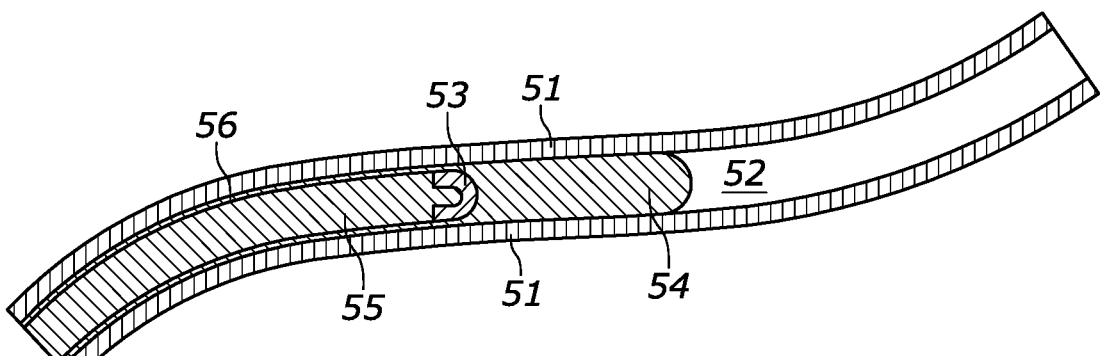
PRIOR ART
FIG. 2

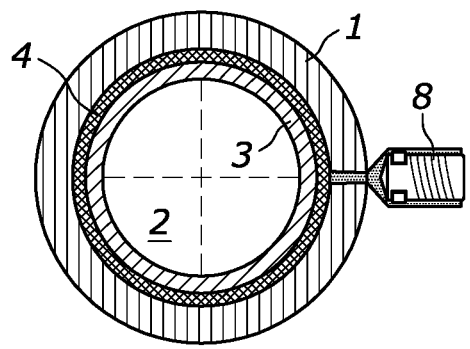
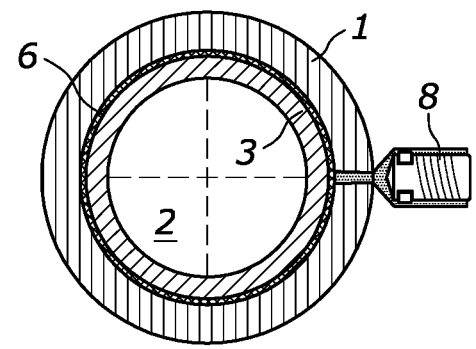
FIG. 4A  FIG. 4B
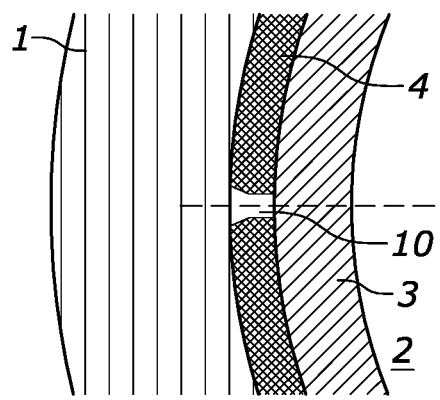
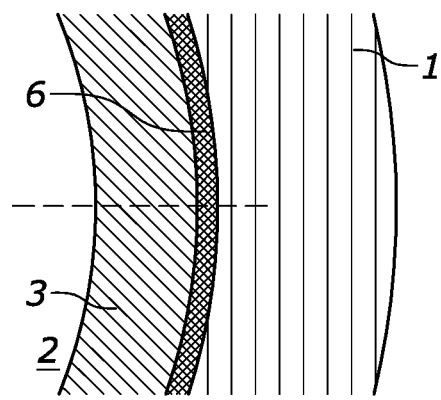
FIG. 5A  FIG. 5B

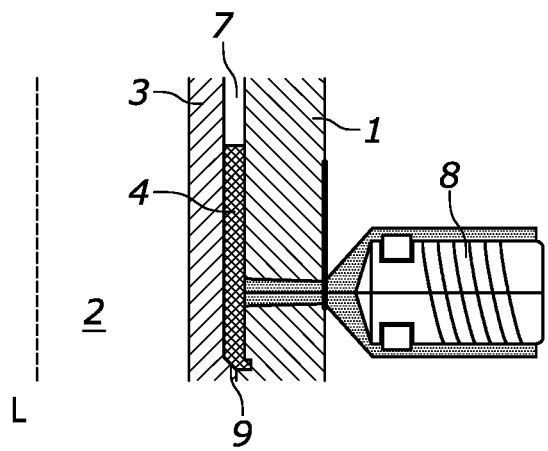
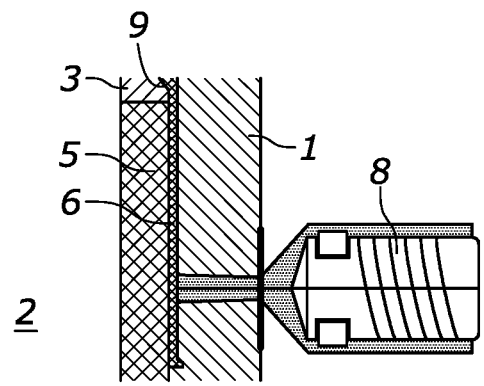
FIG. 6A  FIG. 6B
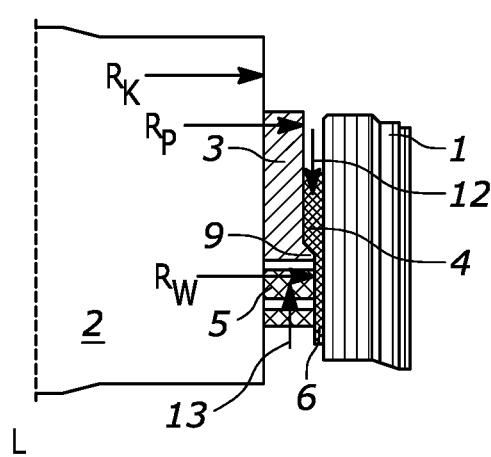
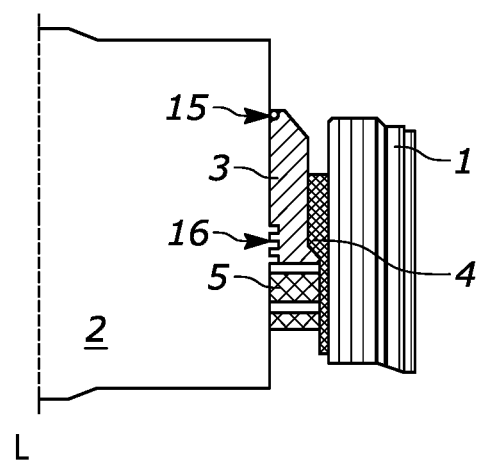
FIG. 7A  FIG. 7B

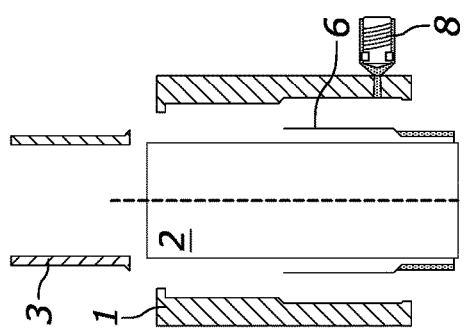
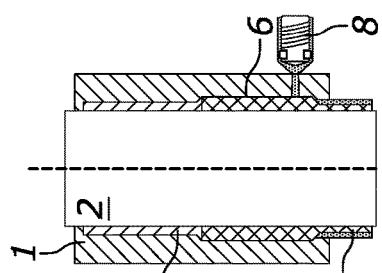
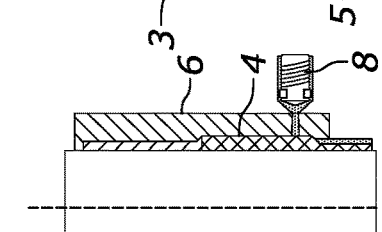
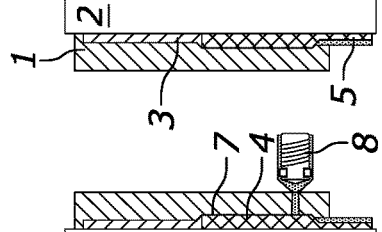
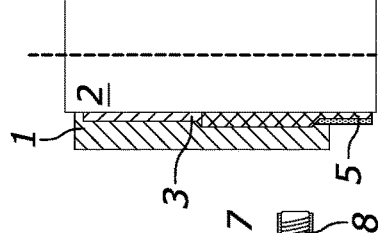
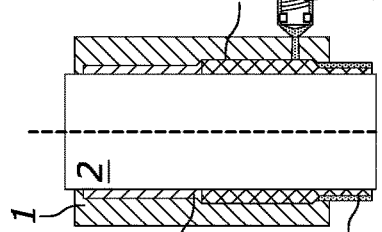
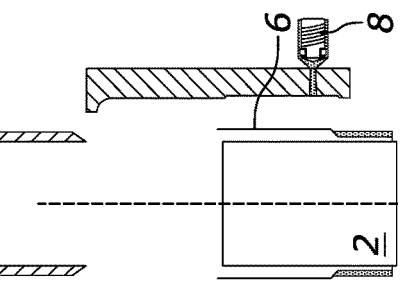
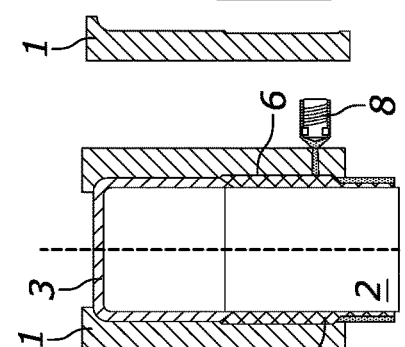
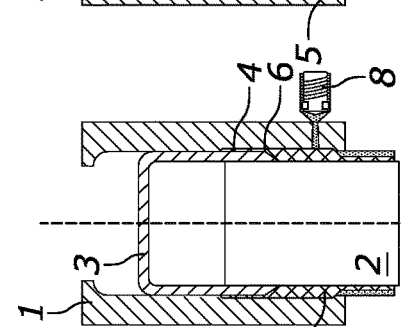
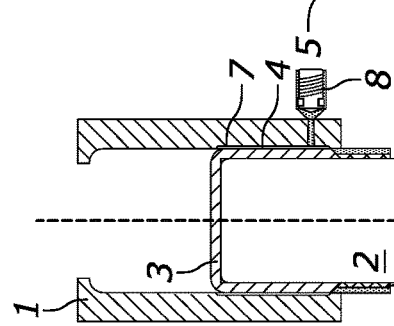

INJECTION-MOLDING DEVICE, PROJECTILE INJECTION PROCESS AND RELATED DEVICES

CROSS REFERENCE TO RELATED APPLICATIONS

This application claims priority to German Patent Application No. DE 10 2018 222 214.2, filed Dec. 18, 2018, and German Application No. DE 10 2019 209 489.9, filed Jun. 28, 2019 wherein the contents of such applications are incorporated herein by reference.

TECHNICAL FIELD

An injection-molding device, a projectile injection process and related devices.

TECHNICAL BACKGROUND

Fluid injection processes by means of which hollow plastic injection-molded workpieces can be produced are known from the prior art. Liquids, gases or aerosols come into consideration here as fluids. The fluid injection process is a multi-stage injection-molding process in which, in a first step, the cavity of the injection mold is completely or partially filled with flowable melt and then, in the following steps, the fluid is injected in order to flush out the workpiece. The melt in this case behaves hydrophobically, i.e. it does not mix with the fluid.

In the last step of the process, the fluid flows out of the workpiece thus formed and leaves behind an injection-molded hollow body, without this hollow space being formed by an injection core. The fluid is used to push the melt ahead of itself and to cover the entire inner wall of the mold or in order to drive out an inner part of the still liquid melt, the outer part of the melt already being partially solidified on the mold wall and it being possible for the melt that is pushed out to be passed on for further use.

The follow-up pressure required for the material strength of the solidifying melt is applied by the fluid directly to the inner surface of the workpiece. In this case, the fluid at the same time assumes a cooling function and thus provides rapid solidification of the melt, and consequently short cycle times. Simpler applications of the fluid injection process directly drive out a specific, not yet solidified portion of the melt and thus produce the desired hollow space of the workpiece.

It is advantageous in the case of this process that hollow bodies can be injection-molded without requiring a corresponding injection core that represents the inner form of the body. As a result, not only are the mold costs lowered, but also easy demolding is made possible.

However, it is disadvantageous that this injection-molding process can no longer be carried out cost-effectively in the case of workpieces with great cross sections, because it would be necessary to inject too much melt, which would subsequently be mostly pushed out, and consequently not used.

As a rule, with this variant of the injection-molding process only wall thicknesses greater than 20% or 25% of the nominal diameter can be created. This means that, in the case of a nominal diameter of for example 20 mm, only a minimum wall thickness of 4 mm can be injection-molded, and no less.

According to the prior art, a subcategory of the fluid injection process, to be specific the projectile injection process, is used to compensate for this disadvantage. Such a process is known for example from DE 10 2008 023 473 A1.

In the case of the projectile injection process, the fluid uses its injection pressure to drive a solid body as a projectile through the not yet completely solidified melt and ahead of itself (drive through). In this way, the hollow space produced is immediately filled. The projectile injection process has the advantage that, as a result of the form of the projectile, a physical and thermal separation of the hot melt from the cold fluid takes place, whereby the projectile can push significantly more melt ahead of itself before the cool fluid makes the melt remaining between the mold inner wall and the projectile solidify.

There is the possibility of driving the projectile through a formation of an unstraight shape, whereby bent and twisted workpieces with a limitedly variable outer contour, but a constant cross section of the inner hollow space, can also be produced. In this way, workpieces with significantly smaller wall thicknesses can be realized, for example about 3 mm in the case of a pipe diameter of about 20 mm.

In addition, this process allows the surface quality of the workpiece to be better kept under control, and consequently to be smoother. When a fiber-reinforced plastic is used, the alignment of the fibers on the coated inner surface of the workpiece is also more homogeneous.

Usually, the projectile injection process allows workpieces with a diameter of about 50 to 60 mm to be produced. However, this process likewise does not allow workpieces with a diameter of for example 100 mm and wall thicknesses of 2 mm to be produced cost-effectively. In spite of using a projectile, too much melt would be pushed ahead of the projectile and wasted. It is not expedient in the case of such great diameters.

BRIEF DESCRIPTION OF THE DRAWINGS

FIG. 1 a, b show an injection-molding device for the projectile injection process according to the prior art, FIG. 2 shows an injection-molding device according to the prior art for bent tubular workpieces, FIG. 3 a, b show an injection-molding device according to the example, with a mold core and a hollow-formed projectile, FIG. 4 a, b show a plan view of the injection-molding device according to the example, with an injection device, FIG. 5 a, b show a view of a detail of a weld line that is produced and a representation of the solidified melt after the driving through of the projectile, FIG. 6 a, b show a further injection-molding device according to the example, with a stripping means on the projectile, FIG. 7 a, b show views of a detail of the projectile, FIG. 9 shows the process steps of a first projectile injection process according to the example, with a continuous core, FIG. 10 shows the process steps of a second projectile injection process according to the example, with a shroud-shaped projectile.

DETAILED DESCRIPTION

Figures 3A, 3B:
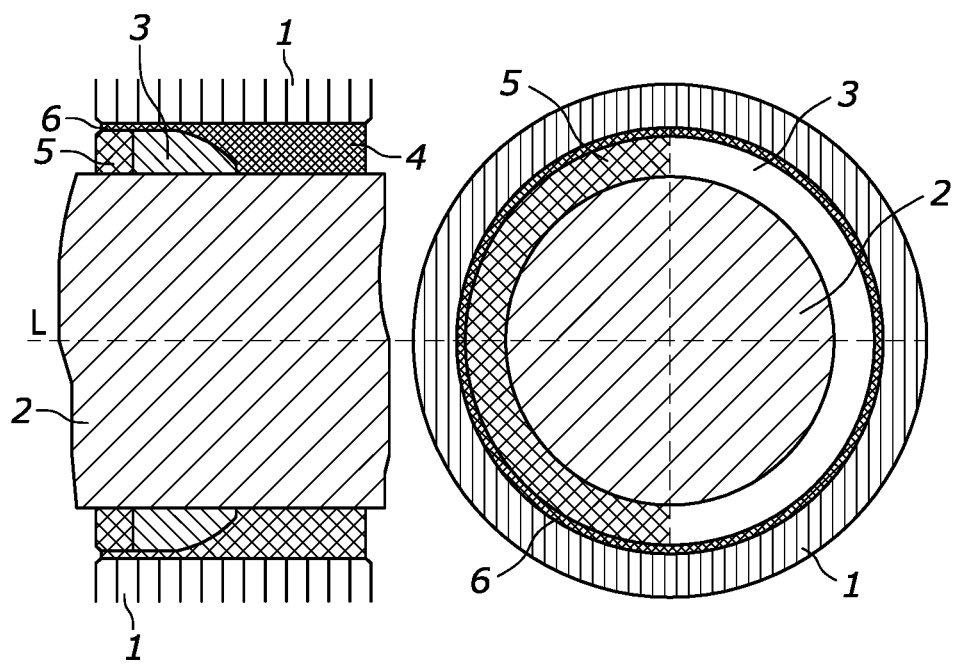

The following detailed description includes references to the accompanying drawings, which form a part of the detailed description. The drawings show, by way of illustration, specific embodiments in which the apparatus may be practiced. These embodiments, which are also referred to herein as "examples" or "options," are described in enough detail to enable those skilled in the art to practice the present embodiments. The embodiments may be combined, other embodiments may be utilized, or structural or logical changes may be made without departing from the scope of the invention. The following detailed description is, therefore, not to be taken in a limiting sense and the scope of the invention is defined by the appended claims and their legal equivalents.

Embodiments herein provide an injection-molding device and a projectile injection process with which as little melt as possible has to be pushed ahead of the projectile, and altogether less melt is used. It is also intended to provide a plastic object which, while of a great diameter, at the same time has a smallest possible wall thickness and at the same time satisfies the required strength criteria.

An injection-molding device for producing a hollow-formed plastic object is provided, at least comprising a mold for the primary shaping of the plastic object, an injection device for at least partially introducing a flowable polymer melt into a cavity within the mold and a fluid injection device for introducing a pressurized fluid and for driving a projectile through the polymer melt introduced into the cavity, the mold comprising a mold wall and a mold core that is arranged at least partially within the mold wall, the projectile being formed at least partially in such a hollow-formed manner that it is arranged on the mold core and is movable along a longitudinal extent of the mold core on the latter.

By using the mold core within the mold wall, a hollow-formed, for example hollow-cylindrical, cavity is produced. By contrast with the prior art, with this injection-molding device it is not necessary to fill the entire cavity with a melt of polymer material in order to produce a hollow-formed plastic object. Instead, the volume to be filled of the cavity is significantly reduced in size by the mold core, in that only the hollow-formed cavity volume has to be filled. This has the effect in particular that less melt has to be used and the projectile also only has to displace a much smaller proportion of melt. By means of this injection-molding device, for the first time hollow-formed plastic objects of a much greater cross section than was previously possible with a projectile injection process can be produced.

In order to form such plastic objects, a matching projectile is pushed onto the mold core. The projectile has a hollow-formed portion which matches the dimensions and the shaping of the mold core. Once positioned on the mold core, the projectile can be displaced along the longitudinal extent of the mold core.

A circular form is used as a preferred cross-sectional form for the mold core and the projectile. That is to say that the mold core is cylindrically shaped and the projectile is in a corresponding way hollow-cylindrically formed. However, polygonal forms can also be used as the cross-sectional area for both parts, while the mold core and the projectile should be made to match one another. Moreover, the form and shape of the plastic object to be produced is determined by the geometrical choice of the cross-sectional form of the projectile with respect to the mold wall.

A further aspect that determines the shape of the plastic object is the choice of the diameter ratios of the mold core, projectile and mold wall. Thus, the outside diameter of the mold core is chosen to be much smaller than the inside diameter of the mold wall in order to form a hollow space that is used as the cavity for the melt.

The inside diameter of the projectile in turn corresponds to the outside diameter of the mold core in order to be movable on it in a sealing way. For sufficient sealing of the sliding surface between the mold core and the projectile, a number of sealing arrangements are provided. Thus, the top of the projectile is enclosed by a stripper ring set into in, which is pressed resiliently against the mold core. When the projectile is driven through the melt, the stripper ring ensures by means of a sharp edge that the melt is drawn off from the mold core and does not penetrate into the sliding surface. Additionally provided at the bottom of the projectile is a sealing assembly comprising a number of seals, which represent an impenetrable labyrinth for the fluid.

The choice of the outside diameter of the projectile with respect to the inside diameter of the mold wall decisively determines the later wall thickness of the plastic object produced. Thus, the wall thickness of the plastic object created can also be varied in its longitudinal extent, in that for example the inner wall of the mold wall has a varying contour profile in the longitudinal direction. That is to say that the mold wall is in some places narrowed or widened.

In one embodiment of the injection-molding device, the projectile is formed in a continuously hollow manner. For example, the projectile may assume the form of a hollow cylinder. Moreover, the mold core extends over an entire length of the mold wall and possibly beyond the mold wall. The completely hollowed-out projectile can be pushed onto the mold core in any desired position and is freely movable along the mold core. Furthermore, the mold wall can be kept short, in that longitudinal dimensions are determined such that, at the end of driving through, the projectile protrudes out of the mold wall.

According to an alternative embodiment, the projectile is formed as a shroud or cup. Here, one end of the mold core lies within the mold wall, while the shroud- or cup-shaped projectile has been pushed onto this end. This advantageously allows the requirements for the seal-tightness of the sliding surface between the projectile and the mold core to be reduced. For structural design reasons, highly compressed fluid cannot find its way between the projectile and the mold core into the injection cavity, since access to the injection cavity is closed by the shroud or cup form.

In one embodiment is a mechanically or electromagnetically operated drive means, which in addition to the fluid injection device ensures that the shroud- or cup-shaped projectile is driven through the polymer melt introduced into the cavity.

An assisting drive means has the effect that the drive force on the projectile is controllable independently of the available fluid pressure and the surface area of the projectile on which it acts. This option may be used by way of example in order in critical injection states to lower the driving-through speed, increase the driving-through speed or keep the driving-through speed consistent. In particular, a consistent driving-through speed is advantageous in order to realize a variable contour shaping of the outer form of the workpiece, which can be varied by the driving-through resistance. In addition, the projectile may also be slowed down, if for example a drive force that is much too high would be generated due to the volume of water required for adequate cooling.

Linear drives such as hydraulic cylinders, spindle drives or linear motors are used for example as drive means, but lever mechanisms are also possible. In this case, the projectile is enclosed at its top. That is to say that the drive means is arranged opposite the fluid injection device and acts on the open side of the mold wall by means of corresponding elements on the projectile. In order to control the driving-through speed of the projectile in a deliberate manner and also determine the position of the projectile reliably, a control device with suitable displacement sensors is used. The displacement sensors allow the position of the projectile on the longitudinal axis of the mold core to be determined very accurately. The control device makes it possible to interconnect the drive control of the drive means with the fluid injection device, in order to move the projectile along the mold core or drive it through the melt on the basis of the process requirements.

According to a further embodiment, the projectile comprises a stripping means on its outer wall. The stripping means is provided at an end region of the projectile that is facing the fluid.

During the injection of the melt from the side with one or more injection devices, a disadvantageous weld line is inevitably produced when the flow fronts flow together. In order to eliminate the weld line of the injected melt that is produced, the stripping means on the projectile is proposed. This stripping means takes the form of a stripping edge on the projectile, whereby a stripping effect is produced. If the projectile is shaped with a smaller cross section at its top, i.e. the side facing the melt, than at its bottom, which is facing the fluid, during the driving through of the projectile the melt is sheared by the stripping means and further compressed. As a result, the material of the boundary layers at the weld line that forms mixes together, eliminating the boundary layers by a homogenization of the material. In addition, the material as a whole is solidified by the build-up of a hydrostatic pressure, which is produced as a reaction to the resistance to the mixing together.

When using the stripping means on the projectile, it is appropriate that the cavity is bounded essentially by the projectile and the mold wall. Here, the polymer melt is only introduced into the hollow space between the projectile and the mold wall. The projectile is in a position on the mold core in which the projectile is located under a nozzle of the injection device. Moreover, the inner wall of the mold wall is configured on a side opposite the fluid injection device as narrowed in such a way that at this point the cavity is closed off. During the driving of the projectile through the melt by means of fluid pressure, the stripping means displaces the still liquid melt, whereby the plastic object to be produced solidifies on the inner wall of the mold wall. The wall thickness of the plastic object is determined in the case of this embodiment by the distance of the stripping means from the inner wall of the mold wall.

According to a further embodiment, interengaging guiding means are provided on the mold core and on the projectile. The guiding means comprise a groove and a guiding profile engaging in the groove, the guiding profile being provided on the mold core and the groove being formed in the projectile. By means of such a guiding device, the projectile is guided along the mold core in the longitudinal direction during the driving through the melt.

In the case of a another embodiment, the guiding profile runs spirally around the mold core. The spiral guiding profile has the effect of bringing about a turning of the projectile. This enforced rotation of the projectile provides further advantageous elimination of the weld line and homogenization of the strength of the material. When a fiber-reinforced plastic is used, a shearing of the melt that is oriented in the circumferential direction also has the advantage that the fibers in the liquid melt are aligned more in the circumferential direction than in the longitudinal direction. This significantly increases the strength of the workpiece in the circumferential direction. Such a produced plastic object is designed particularly for outwardly directed loading.

In an alternative embodiment, a spirally running groove is formed in the mold core and a guiding profile is provided on the inner side of the projectile.

A multiplicity of interengaging pairs of guiding elements comprising a guiding profile and a groove may be used. The guiding profiles and grooves may in this case be evenly distributed in the circumferential direction.

According to a further embodiment, the mold wall is designed with one or more annularly running grooves, i.e. running in the circumferential direction. When it is introduced, the polymer melt flows into these grooves and subsequently solidifies to form a geometrical elevation on the outer side of the plastic object created. This shaping ensures that the finished hollow-formed plastic object has on its outer wall one or more annularly peripheral ribs, which provide local stiffening of the workpiece, and consequently an increase in strength.

The injection-molding device described therefore makes it possible to create an outer contour that differs from the inner contour of the workpiece, so that a variable contour shaping of the outer form can be performed. Thus, variable wall thicknesses can be realized and possibilities for fastening clips, screws, clamps, holders or sensors can be provided on the outer wall.

A further aspect is a projectile injection process for producing a hollow-formed plastic object by means of an injection-molding device, which comprises at least one mold for the primary shaping of the plastic object, an injection device for partially introducing a flowable polymer melt into a cavity within the mold and a fluid injection device for introducing a pressurized fluid and for driving a projectile through the polymer melt introduced into the cavity, with at least the following:

a) positioning the at least partially hollow-formed projectile on a mold core which, as part of the mold, is arranged at least partially within a mold wall of the mold, b) at least partially introducing the flowable polymer melt into the cavity, c) introducing the pressurized fluid and driving the projectile through the polymer melt along a longitudinal extent of the mold core, d) displacing the polymer melt by the projectile and then solidifying the polymer melt to form the plastic object, e) opening the mold wall and removing the plastic object.

The projectile injection process produces plastic objects with great cross sections that are straight and have the thinnest possible walls. By this process, those dimensions that are limiting in the case of known processes are eliminated to the extent that the large volumes and areas required in the case of large workpiece dimensions are filled by the mold core and the dimensions determining the actual injection process are displaced to the outside. That is to say that the process-determining specific force and surface-area ratios between the fluid surface, melt volume etc. are retained, so that it is possible here to rely on empirical values.

This projectile injection process makes it possible for elongate, thin-walled, sleeve-shaped/hollow-formed plastic objects with great diameters to be injection-molded cost-effectively. Using the mold core, on which the projectile is displaced through the melt along the longitudinal extent of the mold core, makes a considerable cost advantage possible, since the use of material is decisively reduced, and consequently also the cycle times are shortened. Consequently, hollow-formed plastic objects can be produced at lower cost.

The workpiece dimensions are for example a length of 100 mm, a wall thickness of about 1.5 to 3 mm and a diameter greater than 50 mm. These plastic objects also have a great cross section/wall thickness ratio, the diameter being about 20 times the wall thickness.

A highly filled short- or long-fiber reinforced thermoplastic is used as the material for the hollow-formed plastic object. This choice of material makes it possible to produce workpieces of higher strength than when using non-reinforced material. The use of materials of this class is advantageous because, in the production of tubular workpieces according to the prior art with small diameters and relatively great wall thicknesses, there was usually no necessity to seek thermoplastics of higher strength. Great curvatures (or small radii of curvature) of the cross sections and the resultant process-related wall thickness meant that in the past unfilled or lowly filled thermoplastics were entirely adequate to meet the requirements for material strength.

It was only the production of workpieces with great cross-sectional dimensions in the manner of the invention and the creation of great cross sections with thin wall thicknesses that has made the choice of material become the focus of attention. Thus, the use of glass or carbon fibers is particularly promising. This choice of material makes it possible to produce workpieces with an even higher strength than when using natural or other fibers, which is of advantage in particular in the case of thin-walled workpieces under internal pressure.

For demolding the solidified plastic object, it helps to make the component parts of the mold of a divided configuration. In this case, the mold wall is divided along a parting plane into two half-shells, which are moved apart in opposite directions for the removal of the plastic object. This configuration makes it possible for the finished injection-molded workpiece to be easily removed from the mold core.

According to another embodiment, the projectile is formed in a continuously hollow manner and is positioned on the mold core in a middle region. The projectile can thus be positioned as desired on the mold core and is freely movable in the longitudinal direction. Thus, the position of the projectile can be adapted according to requirements, without having to make changes to the injection-molding device.

In the case of an alternative embodiment, the projectile is formed as a shroud or cup and is positioned on one end of the mold core. The shroud- or cup-shaped projectile that is positioned on the end of the mold core eliminates the requirements for the seal-tightness that otherwise apply to the continuously hollow-formed projectile. This is so because, as a result of the shroud form of the projectile, no pressurized fluid can get into the cavity during fluid injection.

According to a further embodiment, the projectile comprises a stripping means on its outer wall and the cavity is bounded essentially by the projectile and the mold wall. One type of projectile injection process envisages forming on the projectile a stripping means which shears and compresses the melt during the driving through. Here it is helpful to form the cavity between the projectile and the mold wall. The melt introduced into the hollow space between the projectile and the mold wall distributes itself around the projectile and is displaced during the subsequent driving through, whereby the plastic object is formed.

According to a further embodiment, interengaging guiding means are provided on the mold core and on the projectile, the guiding means comprising at least one groove and a guiding profile engaging in the groove, the guiding profile running spirally around the mold core, whereby the projectile is turned during the driving through.

A turning of the projectile brings about an alignment of the fibers contained in the material in the circumferential direction. This is particularly effective for example in the case of long-fiber reinforced thermoplastics, because the strength of the plastic object to be produced is increased, in particular when under loading from the inside outward.

The embodiments allow the plastic object created by the projectile injection process described to be created variably (in geometry, choice of material and created functionality), at low cost and quickly in terms of carrying out the process.

The embodiments therefore also provide a hollow-formed plastic object which is produced by the projectile injection process according to the invention.

When a fiber-reinforced plastic is used, a plastic object produced by the process has an alignment of the fibers that are not aligned in the longitudinal direction of the plastic object. Generally, injection-molded hollow-formed plastic objects have an alignment of the fibers in the longitudinal direction. However, such plastic objects have a very low loading limit under radially outwardly acting forces. By contrast, in the production of a hollow-formed plastic object by the projectile injection process according to the invention, the fibers distribute themselves unevenly, so that the disadvantageous longitudinal alignment is avoided.

In addition, the turning imparted to the projectile is also of advantage because, as a result, the fibers are aligned in the circumferential direction. A hollow-formed plastic object of which the fibers are aligned transversely in relation to the longitudinal axis has a high resistance to extension.

The plastic object produced by the process also does not have a weld line. A weld line is in principle a potential weakness in the workpiece. During injection, the flow fronts meet one another perpendicularly and fuse together. The lower the pressure and the temperature, the lower the strength of the weld line. Such a disadvantageous weld line is however avoided by the projectile injection process according to the invention. In particular, the stripping means provides advantageous blending of the melt at the flow fronts, whereby the weld line is mixed and homogenized. The plastic object thus produced satisfies the highest strength requirements and the potential of the material strength of the plastics used is exploited in the best possible way.

According to an embodiment, the plastic object has a varying wall thickness in its longitudinal extent. Thus, the plastic object can be adapted in a material-saving way to different loading regions. The plastic object has a first and a second end region, the wall thickness in the second end region being less than the wall thickness in the first end region. In regions under high loading, the plastic object has a wide wall thickness, while the wall thickness in regions under low loading is made thinner.

According to a further embodiment, a means for increasing the strength is provided on the plastic object. This means takes the form of a peripheral protruding rib, which leads to an increase in material in that area, and consequently also to an increase in strength in a region of the plastic object that is under pressure. Such a rib can be created as a negative in the form of a peripheral groove in the mold wall of the injection-molding device.

The geometrical dimensions of the plastic object are such that the diameter is between 110 and 150 mm and the wall thickness is between 1.5 and 3 mm.

As a further embodiment, the plastic object takes the form of an outer guide for an air spring of a motor vehicle. Preferably, here the inner wall of the outer guide is configured as cylindrical. That is to say that the outer guide has a constant inside diameter over the entire length. Furthermore, the outer wall of the outer guide is preferably conically shaped. That is to say that the outer guide has a varying outside diameter over the entire length. For example, the outside diameter of the outer guide in an upper region is greater than the outside diameter of the outer guide in a lower region.

FIG. 1 is intended to illustrate a projectile injection process according to the prior art. The injection-molding device for this known process comprises a closing unit, which consists of the mold itself and which can be separated into two halves by a mold parting plane. Consequently, the form and surface structure of a workpiece 56 to be created is represented by a mold wall 51. In this case, the mold wall 51 encloses a hollow space, also known as a cavity, into which a flowable melt 54 is introduced by an injection unit.

Subsequently, a projectile 53 with a convexly formed top is driven through the liquid melt 54 by introducing a pressurized fluid 55. The shaping of the projectile 53 with respect to the mold wall 51 determines the wall thickness of the hollow-formed workpiece 56 to be created. For this, the outside diameter of the projectile 53 is slightly less than the inside diameter of the mold wall 51, so that, after the driving through of the projectile 53, the melt 54 solidifies on the inner wall of the mold wall 51 and, as a result, the hollow-formed workpiece 56 is created.

In FIG. 2, this known projectile injection process is shown for producing bent pipes. The mold wall 51 is configured in such a curved manner that the workpiece 56 to be created assumes this form. For this, in a cavity 52 heated molding material in a flowable state is introduced as melt 54, and subsequently the projectile 53 is driven through the melt 54 by means of fluid pressure 55. The excess melt 54 is thereby pressed out of the mold. The tubular workpiece 56 of a bent form that has solidified from the molding material is left behind on the mold wall 51.

FIGS. 3 a and b show an injection-molding device according to the example, with the focus on the closing unit or the mold.

FIG. 3a shows a mold wall 1 that can be separated into two halves. In this exemplary embodiment, the mold wall 1 is of a hollow-cylindrical design. Other cross-sectional forms of a hollow-formed mold wall, for example polygonal forms, are likewise conceivable.

Arranged centrally in the interior of the hollow-formed mold wall 1 is a mold core 2. The mold core 2 extends along the mold wall 1 in the longitudinal direction L. It is likewise possible to position the mold core 2 eccentrically in relation to the mold wall 1, in order to create a hollow-formed workpiece 6 with a wall thickness that varies in the circumferential direction. The cross-sectional form of the mold core 2 is adapted to the mold wall 1, and is therefore likewise cylindrically shaped. A wide variety of cross-sectional forms, such as polygonal forms, are also conceivable for the mold core 2.

In order to form a cavity, the outside diameter of the mold core 2 is much less than the inside diameter of the mold wall 1. Consequently, the hollow space between the mold wall 1 and the mold core 2 can be filled with heated molding material as the melt 4.

A further aspect of the injection-molding device according to the example is a hollow-formed projectile 3, which is arranged in a sealing way on the mold core 2. The projectile 3 can be driven by a pressurized fluid 5, and is therefore movable on the mold core 2 in the longitudinal direction L. Liquids, gases and aerosols may be used as the fluid 5.

In order to produce the hollow-formed workpiece 6, the projectile 3 has an outside diameter which is slightly less than the inside diameter of the mold wall 1. During the driving through of the projectile 3 along the mold core 2, the melt 4 is displaced and compressed between the projectile 3 and the mold wall 1, so that, after the driving through of the projectile 3, the workpiece 6 solidifies on the inner side of the mold wall 1. For better driving through, the top of the projectile 3, i.e. the side that is directed toward the melt 4, is of a rounded configuration.

The shape of the mold wall 1, the mold core 2 and the projectile 3 determines the finished form of the workpiece 6. Thus, the wall thickness of the workpiece 6 can therefore be established by choosing the diameter of the mold wall 1 and the projectile 3.

FIG. 3b shows the projectile 3 once again in plan view. It is configured according to the example with an annular shape, the pressurized fluid 5 acting on its planar bottom. Moreover, the projectile 3 is on the centered mold core 2, while the projectile 3 and the mold core 2 are within the mold wall 1.

As a result of the slight difference in diameter of the mold wall 1 in relation to the projectile 3, during the driving of the projectile 3 through the melt along the mold core 2, the hollow-formed/sleeve-shaped workpiece 6 is formed.

FIGS. 4 a and b show the injection-molding device according to the example, with an injection device 8, in plan view. In both figures, the injection device 8 is arranged laterally on the mold wall 1. The starting material is plasticized in the injection device 8 and introduced by means of a screw drive through a closable nozzle into the cavity of the mold. It is likewise conceivable for there to be a number of injection devices.

In FIG. 4a, the injection-molding device is shown before the driving of the projectile 3 through the melt 4 on the mold core 2, and in FIG. 4b the solidified melt can be seen as a hollow-formed workpiece 6 after the driving through of the projectile 3.

FIG. 5a reveals that, during the injection of the melt 4, there form two flow fronts, which run together at a gap 10. As soon as the flow fronts meet one another, a potentially disadvantageous weld line is created. In FIG. 5b, the weld line has become homogenized after being passed over by the projectile 3.

With FIGS. 6 a and b it is intended to illustrate how such a weld line can be advantageously eliminated. In FIG. 6a it is shown how the melt 4 flows into a cavity 7 between the mold wall 1 and the projectile 3, the projectile 3 being in a position on the mold core 2 in which the injection point of the injection device 8 has not yet been completely passed over by the projectile 3.

The introduced melt 4 distributes itself annularly around the projectile 3 and, with two flow fronts, runs together on the other side of the injection point. However, the disadvantageous weld line is thereby produced. In order to eliminate this weld line of the injected melt 4, according to the example a stripping means 9 is provided on the projectile 3. This stripping means 9 is preferably formed on the outer wall of the projectile 3 and is in the lower region of the projectile 3 that is facing the fluid 5. The stripping means 9 consequently takes the form of a peripheral edge or a geometrical elevation of the projectile 3, which partially increases the size of its outside diameter.

In FIG. 6b, the state after the passing over of the injection point is shown, the nozzle of the injection device 8 being closed. The fluid 5 has driven the projectile 3 with its stripping means 9 through the melt past the injection point, the workpiece 6 having solidified on the mold wall 1. The distance of the stripping means 9 from the inner wall of the mold wall 1 accordingly determines the wall thickness of the workpiece to be produced. During the driving through of the projectile 3, the stripping means 9 leads to a further compression of the melt 4, in that the gap between the mold wall 1 and the projectile 3 has become even smaller.

In FIG. 7a, the stripping means 9 is shown once again in more detail. A driving force is required for the movement of the projectile 3 through the melt 4, in order to overcome the resistance of the melt 4 to the driving through of the projectile 3. This driving force is illustrated by the arrow 13. The greater the driving force 13 that is made available, the quicker the driving-through movement takes place, in an advantageous way. By contrast, a force of resistance acts from the melt 4 to be compressed. This force of resistance is illustrated by the arrow 12. Consequently, a lowering of the force of resistance 12 has a positive effect on the driving-through movement. For rapid driving of the projectile 3 through the melt 4, it is aimed to increase the ratio of the driving force 13 to the force of resistance 12.

The rheology of the melt 4 contributes to this ratio. According to the prior art, this is controlled by way of the material viscosity as a result of polymer selection and temperature conditions. The geometrical particularities of the device according to the example make it possible in a particularly advantageous way to generate a great driving force and minimize the force of resistance. In order with a rheologically given specific material resistance to lower the force of resistance to be overcome, it is required to reduce the size of the annular surface area of the projectile 3 that is effective with respect to the melt 4 and at which the hydrostatic pressure building up due to the resistance is established in the melt 4. Therefore, inter alia, it is advantageous to make the top rounded.

The use according to the example of a stripping means 9 on the projectile 3 allows a further reduction in the effective surface area on which the pressure of the rheological resistance of the melt 4 acts. This surface area can be kept very small by the geometry of the stripping means 9 being formed as increasingly diminishing. The outside diameter of the projectile 3, indicated by the radius $R_P$, increasingly approximates to the final inside diameter of the workpiece 6 to be created, which is denoted by the radius $R_W$.

In the case of a circular projectile 3, the outside diameter of the projectile 3 in the region of the stripping means 9 therefore increases towards the inner wall of the mold wall 1. This geometrical shaping according to the example also has the effect of increasing the surface area on which the fluid 5 acts on the bottom of the projectile 3, which provides greater drive. This is so because the size of the driving force 13 is obtained as a product of the fluid pressure and the surface area on which the fluid 5 acts. For machine-dependent reasons, the fluid pressure or the available fluid flow at a desired fluid pressure may be limited. For this reason, the aim is according to the example to increase the size of the surface area on which the fluid pressure acts, without having to accept other disadvantages as a result. This is possible, process-dependently, by the choice of diameter of the mold core 2, which is symbolized by the radius $R_K$. The smaller the diameter of the mold core 2 is in relation to the generating inside diameter of the workpiece 6, the greater the surface area on which the fluid pressure acts.

FIG. 7b illustrates the sealing of the projectile 3 on the mold core 2 in detail. In order that no fluid 5 can find its way into the melt 4 along the sliding surface between the mold core 2 and the projectile 3, sealing measures have been taken.

At the top of the projectile 3, a first sealing arrangement 15 is provided. This comprises at least one stripping ring with a contoured outer contour. By means of a sharp edge of the outer contour of the stripping ring, it is ensured that the melt 4 is drawn off from the mold core 2. The stripping ring is also resiliently configured, so that it is pressed against the mold core 2.

On the bottom of the projectile 3, the sliding surface must be sealed with respect to the fluid 5. For this, a second sealing arrangement 16 is provided. For this, a sealing assembly comprising a number of seals is provided, likewise resiliently enclosed and representing an impenetrable sealing labyrinth.

For a high-grade sealing of the projectile 3 on the mold core 2, a high surface quality of the mold core 2 is of advantage. Thus, the mold core 2 is for example produced from a chromium-containing steel alloy, its surface subsequently being polished to a very smooth finish. The surface quality of the projectile 3 is also important for the sealing. Thus, the surface quality of the groove receptacles for the stripping rings or seals plays a great part, so that the projectile 3 is produced from a steel, from bronze or from ceramic with similar coefficients of thermal expansion. The resilient stripping rings or seals are preferably produced from sintered and ground steel. The seals of the second sealing assembly 16 may also consist of silicone rubber.

Figure 8:
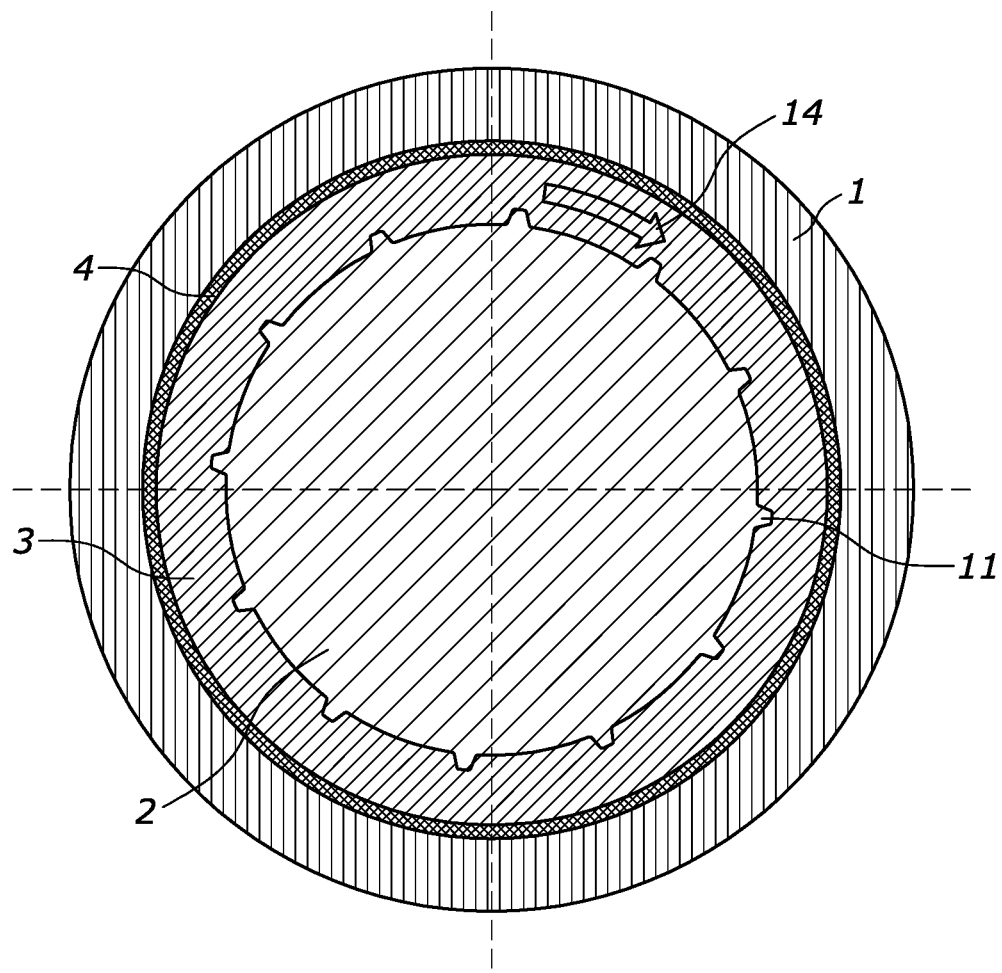
FIG. 8 shows a further injection-molding device according to the example, the mold core and the projectile having guiding means.

FIG. 8 is the plan view of a further injection-molding device according to the example, the mold core 2 having a multiplicity of guiding means. A pair of guiding means respectively comprise a guiding profile 11, which engages in a groove. Guiding profiles 11 are elevations on the mold core 2, which run in the longitudinal direction and bring about at least a longitudinal guidance of the projectile 3. For this, corresponding grooves are made in the projectile 3.

Guiding profiles 11 are of a twisted configuration, i.e. they run spirally around the mold core 2, so that a turning 14 is imparted to the projectile 3. During the axial driving through of the projectile 3 along the mold core 2, the projectile 3 undergoes a turning movement on account of the spiral shaping of the guiding profiles 11. That is to say that the projectile 3 is turned in the circumferential direction. This turning brings about an advantageous shearing on the still liquid melt 4 and leads to further homogenization. In particular, in the case of fiber-reinforced plastics, their fibers are turned and aligned in the circumferential direction.

In FIG. 9, the process steps of a first projectile injection process according to the example are shown.

Thus, process step a) shows the injection-molding device taken as a basis in the starting position. Provided within a mold wall 1 is a continuous mold core 2. Arranged on the mold core 2 is a projectile 3. Arranged laterally of the mold wall 1 is a closable injection device 8. Formed between the projectile 3 and the mold wall 1 is a cavity 7. Acting on the bottom of the projectile 3 is a fluid 5, which is pressurized by means of a fluid injection device that is not shown, in order to drive the projectile 3.

During process step b), flowable melt 4 is introduced into the cavity 7 by means of the injection device 8.

Subsequently, in process step c), the nozzle of the injection device 8 is closed and the projectile 3 is moved on the mold core 2 in the longitudinal direction by means of fluid pressure 5. During the driving through of the projectile 3, the melt 4 solidifies on the inner side of the mold wall 1 to form a hollow-formed workpiece 6.

In process step d), the projectile 3 is driven through in a separately provided clearance, which is present between the mold wall 1 and the mold core 2 behind the cavity. This has the advantage that the temperature of the projectile 3 can be kept under control very well. Moreover, the projectile 3 is guided in a straight line in its driving-through movement and the end position can be finely set. It is also possible to use a mold wall 1 with which the projectile 3 protrudes out of the mold wall 1 at the end of the driving-through movement. This saves material for the mold wall 1, and consequently lowers the mold costs. In the same process step, fluid 5 is also let out.

With the last process step e), the removal of the workpiece 6 takes place. For this purpose, the mold wall 1 is opened into two halves along a parting plane. The projectile 3 and the workpiece 6 can be pulled off from the mold core 2. Finally, a finishing of the plastic object produced by means of the projectile injection process is performed.

FIG. 10 illustrates a second projectile injection process according to the example, the injection-molding device being of a modified form. By contrast with a continuous mold core, on which an annular projectile is displaceable, in this embodiment there is a shroud-shaped projectile 3. That is to say that the projectile 3 has a closed top, so that it is fitted onto one end of the mold core 2.

In step a), the starting position of this injection-molding device is shown. Arranged at least partially within a mold wall 1 is a mold core 2, which does not extend over the entire length of the mold wall 1. That is to say that one end of the mold core 2 is within the mold wall 1. A shroud-shaped projectile 3 is fitted or pushed onto this end of the mold core 2. Lying against the bottom of the projectile 3 is a fluid 5, which is pressurized by means of a fluid injection device that is not shown. The projectile 3 and the mold wall 1 are formed at a certain distance from one another, so that there is a cavity 7 in between. An injection device 8 is arranged laterally of the mold wall, in order to introduce a flowable melt into the cavity 7.

A melt 4 is immediately injected into the cavity 7 in step b) by means of the opened injection device 8. The melt 4 thereby fills the cavity 7 at least partially.

In step c), the injection device 8 is closed and fluid pressure 5 acts on the bottom of the projectile 3, so that the projectile 3 is driven along the mold core 2. The melt 4 thereby solidifies on the mold inner wall 1 to form a hollow-formed workpiece 6.

Process step d) shows the projectile 3 in its end position in the mold wall 1, fluid 5 already having been let out.

Finally, in step e), the removal of the workpiece 6 takes place. The mold wall 1 is separated into two halves; the projectile 3 can be removed and the workpiece 6 is pulled off from the mold core 2. The finishing of the workpiece 6 is performed to form the plastic object to be produced.

Figure 11:
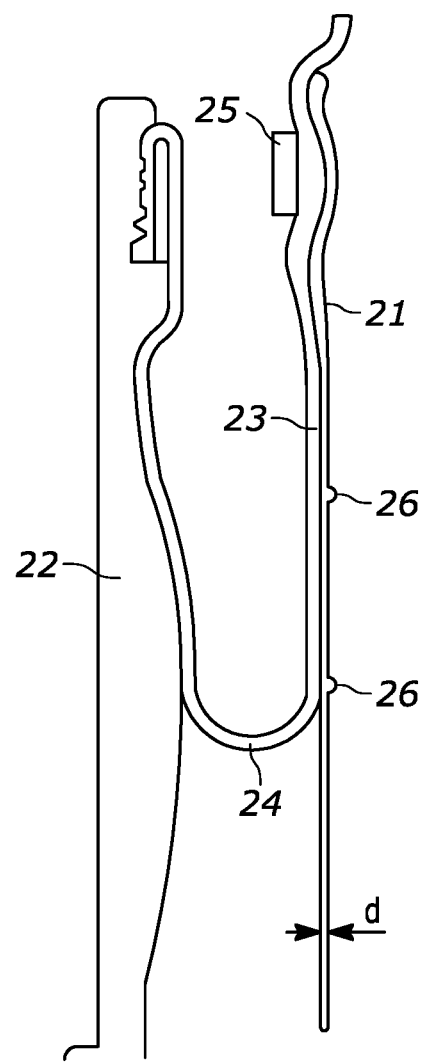
FIG. 11 shows an outer guide for an air spring as a plastic object.

FIG. 11 shows a sleeve-shaped plastic object in the form of an outer guide 21 for an air spring of a motor vehicle. The outer guide 21 is fastened on a rolling lobe 23 by means of a clamping ring 25, which is positioned on the inner side of the rolling lobe 23 and against which the outer guide 21 is pressed, so that the outer guide 21 is fastened on the rolling lobe 23 in a rigid position.

The rolling lobe 23 is fastened on a connecting part (for example a rolling piston) 22 by means of a clamping ring and rolls on it to form a rolling fold 24. The rolling fold 24 at the same time lies against the inner side of the outer guide 21.

Because the rolling lobe 23 is under internal pressure, the outer guide 21 is required in order to restrain the rolling lobe 23 and prevent inflation. Therefore, the outer guide 21 represents an expansion limitation for the rolling lobe 23. In the interests of a lightweight and material-saving configuration, it is advisable to keep the wall thickness d of the outer guide as thin as possible. However, the local loads on the outer guide 21 are varied. In principle, the loading on an outer guide 21 can be divided into four local regions.

The outlet of the rolling lobe 23 represents a first region. It outlines the transitional region at which the rolling lobe 23 leaves the outer guide 21 in the vicinity of the clamping ring 25 and forms a cardanic fold.

Regarded as a second region is the upper end region of the outer guide 21, which at the same time represents the fastening region of the outer guide 21 on the rolling lobe 23 by means of the clamping ring 25.

Underneath the second region there is a third region. This is characterized in that the point of detachment of the rolling fold 24 in the normal level position lies within this region. The third region is defined by the highest point of detachment of the rolling fold 24 in the compressed state and by the lowest point of detachment of the rolling fold 24 in the rebounded state.

Finally, understood as a fourth region is the lower end region of the outer guide 21 that is facing the connecting part 22. This fourth region is considered to be an unloaded state, since the rolling fold 24 does not lie against it in a compressed state.

It has been recognized that the outer guide 21 is exposed to different pressures over its entire length, and consequently has to meet different strength requirements from region to region. Thus, the highest loading occurs directly at the outlet of the rolling lobe 23 from the outer guide 21 in the first region. In the case of the normal level position, the loads in the second and third regions are approximately the same as a result of the internal pressure in the working space of the air spring. The loading on the fourth region is negligible, since it is not rolled over by the rolling lobe 23.

On the basis of these findings, a wall thickness reduction according to the example from the outer guide 21 over its axial length is proposed.

Since the highest loading occurs in the second region, the required wall thickness d is set to 100% in this region. A wall thickness d of 100% meets the necessary strength requirements of the outer guide 21 to withstand the internal pressure of the working space of the air spring. Thereafter, the wall thickness d can begin in the third region with 67% and be decreased further to 35%. The wall thickness d in the fourth region is governed by the thicknesses of the projectile injection process that can be produced as a minimum.

Therefore, the proposed injection-molding device with the associated projectile injection process is extremely suitable for producing workpieces from plastic which have a great diameter (for example 110 to 150 mm) and at the same time have a very small wall thickness d (for example 1.5 to 3 mm). At the same time, with these plastic objects, the wall thickness d can be varied along the longitudinal extent thereof. This can be realized by the shaping of the mold wall.

Consequently, over the longitudinal extent of the outer guide 21, its wall thickness d varies and can lead to a material saving of 13% in comparison with purely cylindrical outer guides. As the figure therefore reveals, the outer guide 21 narrows in the downward direction, so that a material and weight saving is achieved.

In addition, the outer guide 21 has been provided with means for increasing the strength 26. The outer guide 21 has on its outer wall a number of annularly peripheral ribs 26. These lead to a local stiffening or increase in strength, with at the same time a reduction in the wall thickness. Preferably, one or more ribs 26 are formed in the second and third regions of the outer guide 21. Ribs 26 are created by a corresponding groove in the mold wall during the injection-molding of the plastic outer guide 21.

The above description is intended to be illustrative, and not restrictive. Many other embodiments will be apparent to those of skill in the art upon reading and understanding the above description. Embodiments discussed in different portions of the description or referred to in different drawings can be combined to form additional embodiments of the present application. The scope should, therefore, be determined with reference to the appended claims, along with the full scope of equivalents to which such claims are entitled.

LIST OF DESIGNATIONS

1 Mold wall
2 Mold core
3 Projectile
4 Melt
5 Fluid
6 Workpiece
7 Cavity
8 Injection device
9 Stripping means
10 Gap
11 Guide profile
12 Force of resistance
13 Driving force
14 Turning
15 First sealing arrangement
16 Second sealing arrangement
21 Outer guide
22 Connecting part
23 Rolling lobe
24 Rolling fold
25 Clamping ring
26 Means for increasing the strength
51 Mold wall
52 Cavity
53 Projectile
54 Melt
55 Fluid
56 Workpiece
d Wall thickness+
L Longitudinal axis of the mold core
$R_K$ Radius of the mold core
$R_P$ Radius of the projectile
$R_W$ Radius of the workpiece

The invention claimed is:

1. An injection-molding device for producing a hollow-formed plastic object, comprising:
    a mold for the primary shaping of the plastic object;
    a mold core arranged within the mold;
    a continuously hollow projectile arranged around an exterior of the mold core;
    an injection device for introducing a flowable polymer melt into the mold;
    a fluid injection device for introducing a pressurized fluid into the mold for driving the projectile along the mold core through the flowable polymer melt.

2. The injection-molding device as claimed in claim 1, wherein the mold core extends over an entire length of the mold wall.

3. The injection-molding device as claimed in claim 1, wherein the projectile comprises a stripping means on its outer wall.

4. The injection-molding device as claimed in claim 3, wherein the stripping means is provided at an end region of the projectile that is facing the pressurized fluid.

5. The injection-molding device as claimed in claim 3, wherein a cavity of the mold is bounded by the projectile and an inner wall of the mold.

6. The injection-molding device as claimed in one of claim 1, wherein interengaging guiding is provided on the mold core and on the projectile.

7. The injection-molding device as claimed in claim 6, wherein the interengaging guiding comprises at least one groove and a guiding profile engaging in the groove, the guiding profile being provided on the mold core and the groove being formed in the projectile.

8. The injection-molding device as claimed in claim 6, wherein the guiding profile runs spirally around the mold core.

9. The injection-molding device as claimed in claim 1, further comprising a groove running in a circumferential direction is formed on an inner side of the mold.

10. The injection-molding device as claimed in claim 1, wherein the projectile is driven along the surface of the mold core and axially relative to the interior mold wall.

11. An injection-molding device comprising:
    a hollow mold comprising an interior mold wall;
    a mold core extending in a longitudinal direction of the mold along the interior mold wall; and
    a continuously hollow projectile arranged around the mold core, wherein an outer diameter of the projectile is less than an inner diameter of the interior mold wall, wherein the hollow projectile is axially moveable along the mold core.

12. The injection-molding device as claimed in claim 11, wherein the hollow mold comprises a hollow, cylindrical mold, the mold core comprises a cylindrical mold core corresponding to a cylindrical shape of the hollow, cylindrical mold, and the hollow projectile comprises a hollow, cylindrical projectile corresponding to a shape of the hollow, cylindrical mold.

13. The injection-molding device as claimed in claim 12, wherein the projectile is sealed around the mold core.

14. The injection-molding device as claimed in claim 13, further comprising:
    an injection device configured to introduce a polymer melt into a hollow space between the mold wall and the mold core.

15. The injection-molding device as claimed in claim 14, further comprising:
    a fluid injection device configured to introduce a pressurized fluid into an end of the hollow mold to drive the projectile along the mold core through the polymer melt.

16. The injection-molding device as claimed in claim 15, wherein the projectile comprises a stripping means provided on an outer wall of the projectile, and
    wherein an outer diameter of the projectile and the stripping means is greater than the outer diameter of the projectile.

17. The injection-molding device as claimed in claim 11, wherein the projectile is driven along the surface of the mold core and axially relative to the interior mold wall.

\* \* \* \* \*